Patented May 12, 1942

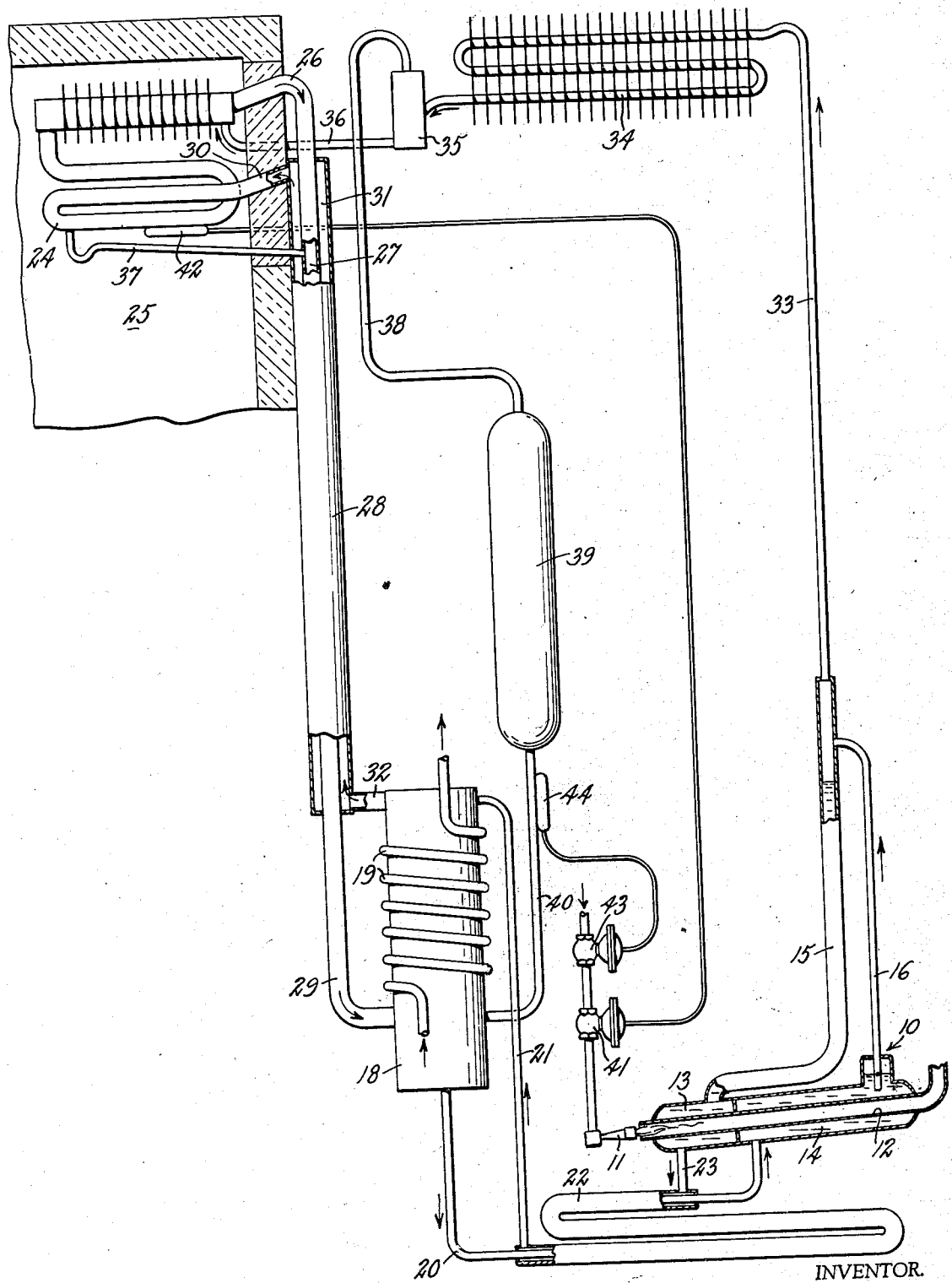

2,282,684

UNITED STATES PATENT OFFICE 2,282,684

REFRIGERATION

Robert S. Taylor, Evansville, Ind., assignor to Servel, Inc., New York, N. Y., a corporation of Delaware Application April 28, 1937, Serial No. 139,392

18 Claims. (Cl. 62—5)

My invention relates to refrigeration and more particularly to a refrigeration system utilizing absorption and expulsion of refrigerant fluid.

It is an object of my invention to provide an improved apparatus and method of operation to increase the efficiency of a refrigeration system of this type.

The invention, together with the objects and advantages thereof, is set forth with particularity in the following description and the accompanying drawing in which the single figure shows more or less diagrammatically a refrigeration system embodying the invention.

The refrigeration system shown in the drawing is generally like that described in U. S. Patent 1,609,334 to von Platen and Munters. A generator 10 is heated by a gas burner 11. The gas burner is arranged so that the flame is projected into the lower end of a flue 12 which extends through chambers 13 and 14 of the generator. The lower end of a standpipe 15 is connected to the chamber 13. The lower end of a vapor liquid lift conduit 16 extends into chamber 14 and the upper end of the lift conduit 16 is connected to the upper end of the standpipe 15. The generator 10 may be heated by other means than the gas burner 11. It may be heated, for instance, by a kerosene burner or an electric heating element.

An absorber 18 is provided with a cooling coil 19 through which may be circulated a suitable fluid for carrying away heat from the absorber. The coil 19 may be the evaporator of an evaporation-condensation heat transfer circuit in which the condenser is air cooled. The absorber 18 may also be directly cooled by air, water, or other cooling medium. The absorber 18 and the generator 10 are interconnected for circulation of liquid therethrough and therebetween. The lower part of the absorber is connected by a conduit 20 to chamber 14 of the generator 10. The upper part of the absorber 18 is connected by a conduit 21, a jacket 22 around conduit 20, and a conduit 23 to chamber 13 of the generator. The jacket 22 around the conduit 20 forms a heat exchanger in which heat is transferred between liquid flowing to and from the generator. An evaporator 24 is located in an insulated refrigerator compartment 25. The upper end of the evaporator 24 is connected by a conduit 26, the inner passage 27 of a gas heat exchanger 28 and conduit 29 to the lower part of the absorber 18. The lower end of the evaporator 24 is connected by a conduit 30, an outer passage 31 of the gas heat exchanger 28, and a conduit 32 to the upper part of the absorber 18.

The upper end of the generator standpipe 15 is connected by a conduit 33 to the upper end of an air cooled condenser 34. The lower end of the condenser 34 is connected to a chamber 35, herein referred to as a vent chamber. The lower part of the vent chamber 35 is connected by a conduit 36 to the upper end of the evaporator 24. The conduit 36 and chamber 35 form a liquid trap seal between the condenser 34 and the evaporator 24. The lower part of the evaporator 24 is connected by a drain conduit 37 to the inner passage 27 of the gas heat exchanger 28.

The upper part of the vent chamber 35 is connected by a conduit 38 to the upper part of a vessel 39, herein referred to as a pressure vessel or reserve vessel. The lower end of the pressure vessel 39 is connected by a conduit 40 to the absorber 18.

The above described system is hermetically sealed and all parts of the system are in permanent open fluid communication. A refrigerant fluid, a liquid absorbent, and an inert gas are placed in the system after it is evacuated and before it is finally sealed. The fluids may be introduced by means of a charging plug (not shown) in the absorber 18. When the system has been evacuated, a water solution of ammonia of the desired quantity and concentration is placed in the system and the inert gas is introduced into the system at a desired pressure. A 30% water solution of ammonia may be used and the pressure of the hydrogen gas introduced is such that the total pressure in the system will be the condensation pressure for ammonia at a fairly high room temperature.

In operation, ammonia vapor is expelled from solution by heat in the generator 10. The expelled ammonia vapor flows through conduit 33 into condenser 34 where the ammonia vapor is condensed to liquid by heat transfer to the air. Liquid ammonia flows from the condenser 34 into chamber 35 and thence through conduit 36 into the upper end of the evaporator 24.

In the evaporator 24, the liquid ammonia flows downward and evaporates in the presence of the inert hydrogen gas, the evaporation producing a refrigeration effect. Ammonia vapor is carried out of the evaporator and into the absorber 18 by circulation of gas. The gas flows from the upper end of the evaporator 24 through conduit 26, the heat exchanger 28 and conduit 29 into the absorber 18. Gas flows out of the absorber 18 through conduit 32, the gas heat exchanger 28, and conduit 30 into the lower end of the evaporator 24.

Absorption liquid, or weakened solution, from which ammonia vapor has been expelled flows through conduit 23, liquid heat exchanger 22, and conduit 21 into the upper end of the absorber 18. Absorption liquid flows downward in the absorber 18 and absorbs ammonia vapor out of gas in the absorber. Enriched absorption liquid flows from the lower end of the absorber 18 through conduit 20 and liquid heat exchanger 22 into chamber 14 of the generator 10. Ammonia vapor expelled by heating of enriched solution in chamber 14 causes liquid to rise through conduit 16 into the upper end of the standpipe 15. This liquid circulation between the generator and absorber takes place because the lifting of liquid through conduit 16 by vapor causes the level of liquid in the standpipe 15 to rise high enough so that liquid overflows from the upper end of conduit 21 into the absorber 18.

Flow of gas to the gas burner 11 is controlled by a thermostatic valve 41 of which the sensitive bulb 42 is located in contact with the evaporator 24 so that the valve 41 is operated responsive to a temperature condition affected by the evaporator 24. Valve 41 opens to admit more gas to the burner 11 upon increase in temperature of the evaporator 24 and closes to decrease the burner flame upon decrease in temperature of the evaporator 24 so that operation of this valve controls the heat input to the system whereby the evaporation temperature is maintained substantially constant. Upon opening movement of the valve 41, the increase in the burner flame causes more rapid expulsion of ammonia vapor from solution and also faster circulation of solution between the generator and absorber because of greater flow of liquid upward through conduit 16. The faster flow of weaker solution causes a greater rate of absorption of ammonia vapor in the absorber 18. This permits a greater rate of evaporation of ammonia in the evaporator 24. If the burner flame, that is, the heat input to the system, is increased above a certain rate, more ammonia vapor will be expelled from solution than can be condensed to liquid in the condenser 34. This will also occur when the heat input remains constant while the room temperature, that is, the temperature of air cooling the condenser 34, increases above a certain value. Uncondensed ammonia vapor passes through the condenser 34 into the vent chamber 35 and thence through conduit 38, pressure vessel 39 and conduit 40 into the absorber 18. Ammonia vapor flowing into vessel 39 displaces reserve hydrogen gas from this vessel through conduit 40 into the absorber 18 so that the total pressure in the system is increased and more ammonia may be condensed in the condenser 34.

The maximum performance of this system when the room temperature is high is determined by the ability of the condenser to dissipate the heat of condensation. In lower room temperatures, the condenser could handle more refrigerant so that the system could have a higher heat input with a corresponding better performance. This ability of the system to take a higher input cannot be utilized when the maximum heat input is limited for the worst conditions. When the input is too high for a particular condenser surface, ammonia vapor vents as previously described to the absorber. Ammonia vapor flowing through conduit 38, pressure vessel 39, and conduit 40, causes this part of the system to become in effect a continuation of the condenser and the temperature of this part of the system rises.

In accordance with my invention this phenomenon is utilized to control the maximum heat input to the system to increase the efficiency of operation. In addition to the thermostatic control valve 41, I provide a thermostatic valve 43 of which a sensitive bulb 44 is placed in contact with conduit 40 below the pressure vessel 39. The thermostatic valve 43 is connected in the gas supply line to the burner 11 and is normally adjusted to an open position in which the maximum amount of gas which the control valve 41 can permit to flow to the burner is limited. This adjustment is made so that the maximum burner flame is determined for a low room temperature. In other words, the maximum flame adjustment is made for the best conditions rather than the worst conditions. If this maximum flame is too high, upon increase in room temperature the venting of ammonia vapor causes an increase in temperature of conduit 40 and sensitive bulb 44 causes operation of the thermostatic valve 43 to decrease the maximum supply of gas that the control thermostat 41 may permit to flow to the burner. Thus at all times the maximum flame, that is, the maximum heat input to the system, is the most efficient for the particular conditions under which the system is operating.

When condenser capacity is referred to herein, the ordinary meaning is intended, namely, the quantity in weight of fluid that can be changed from vapor phase to liquid phase in a unit of time. In a given condenser the capacity varies with the temperature differential in the path of heat dissipation.

My invention is not limited as described in the foregoing part of the specification and shown in the drawing but only as indicated in the following claims.

What I claim is:

1. A refrigeration system including an evaporator, a condenser, a generator connected to supply vapor to said condenser, a heater for said generator, and means for controlling the heating rate of said heater in accordance with variation in capacity of said condenser.

2. A refrigeration system including an evaporator, a condenser, a generator connected to supply vapor to said condenser, a heater for said generator, and means for controlling the heating rate of said heater in accordance with both a temperature condition affected by said evaporator and another temperature condition affected by variation in capacity of said condenser.

3. A refrigeration system including an evaporator, a condenser, a generator connected to supply vapor to said condenser, a heater for said generator, and two thermostats for controlling the heating rate of said heater, one of said thermostats being operative responsive to a temperature condition affected by said evaporator and the other of said thermostats being responsive to another temperature condition affected by variation in capacity of said condenser.

4. A refrigeration system including an evaporator, a condenser, a generator connected to supply vapor to said condenser, a gas burner for heating said generator, a gas supply line for said burner, a first valve for controlling flow of gas to said burner, a thermostat for operating said valve responsive to a temperature condition affected by said evaporator, a second valve in said supply line for varying the maximum rate of flow of gas therethrough, and a second thermostat for operating said second valve responsive to a temperature condition affected by variation in capacity of said condenser.

5. In a refrigeration system employing evaporation of refrigerant fluid in the presence of inert gas, a generator and a condenser for separating liquid refrigerant fluid from absorption liquid, a heater for said generator, means for varying maximum rate of heat transfer from said heater to said generator, and means for operating said rate varying means to decrease said maximum heat transfer upon flow of vaporous refrigerant fluid out of said condenser.

6. In combination with a thermally insulated space and a refrigeration system including an evaporator arranged to cool the space, a generator, a heater for the generator, and a control for the heater to cause supply of heat to the generator at a plurality of different rates, a device for operating said control to decrease the rate at which the heater supplies heat to the generator with increase in a temperature condition affected by temperature of air outside the space.

7. In combination with a refrigerator having a thermally insulated storage space and a refrigeration system including an evaporator arranged to cool the space, a generator, a heater for the generator, and a first control for controlling said heater to vary the rate of heating the generator responsive to a temperature condition affected by the evaporator, a second control responsive to a temperature condition affected by temperature of air outside the thermally insulated space for controlling said heater to decrease the rate of heating the generator with increase in said air temperature.

8. In a refrigeration system of a uniform pressure type operated by heat and cooled by air, that improvement which consists in decreasing the supply of heat to the system in amounts which vary with the degree of increase in a temperature condition affected by the temperature of said cooling air.

9. In an air cooled refrigeration system of a uniform pressure type operated by heat and cooled by air, such system being arranged to cool a space, that improvement which consists in supplying heat to the system responsive to a temperature condition affected by the refrigeration temperature produced by the system, and decreasing the supply of heat to the system in amounts which vary with the degree of increase in a temperature condition affected by the temperature of said cooling air.

10. In an air cooled refrigeration system having a condenser connected to receive vapor from a generator, a control element movable to a plurality of positions in each of which heat is supplied to said generator at a different rate, and means for operating said control element in accordance with variation in a temperature condition affected by the temperature of air used for cooling said condenser.

11. In refrigeration with a system in which refrigeration fluid is expelled from a solvent, the expelled refrigerant fluid liquefied by condensation, the liquefied refrigerant evaporated in the presence of inert gas, and the evaporated fluid absorbed out of the gas into the solvent, that improvement which consists in carrying out above said expulsion of refrigerant fluid from the solvent at different rates, and changing from one rate of expulsion to another in response to change in the temperature of said condensation.

12. In refrigeration with a system employing expulsion of refrigerant fluid from a solvent, liquefaction of the expelled refrigerant fluid in a condenser, evaporation of the liquefied refrigerant in the presence of inert gas, and absorption of evaporated refrigerant out of the gas into the solvent, that improvement which consists in carrying out such expulsion of refrigerant fluid from the solvent at different rates, and changing from one rate to another in response to change in capacity of said condenser.

13. In refrigeration with a system employing expulsion of refrigerant fluid from a solvent, liquefaction of the expelled refrigerant fluid by condensation, evaporation of the liquefied refrigerant in the presence of inert gas, and absorption of the evaporated refrigerant out of the gas into the solvent, that improvement which consists in carrying out above said expulsion of refrigerant fluid from the solvent at different rates, and changing from one rate to another in response to a change in temperature of said condensation and also changes in a temperature condition affected by said evaporation.

14. In refrigeration with a system employing expulsion of refrigerant fluid from a solvent, liquefaction of the expelled refrigerant fluid in a condenser, evaporation of the liquefied refrigerant in the presence of inert gas, and absorption of the evaporated refrigerant out of the gas into the solvent, that improvement which consists in carrying out such expulsion of refrigerant fluid from the solvent at different rates, and changing from one rate to another in response to change in capacity of said condenser and also changes in a temperature condition affected by said evaporation.

15. In a refrigeration system employing evaporation of refrigerant fluid in the presence of inert gas, an evaporator, a generator, a condenser, a heated for said generator, and a controller for said heater operative responsive to changes in a temperature condition affected by said evaporator to vary the heating effect of said heater in a range having maximum and minimum values, a device for changing said maximum value and thus the rate of heat transfer from said heater to said generator at the maximum end of said range, said device being operative to change said maximum to a lower value in response to decrease in capacity of said condenser.

16. In a heat operated refrigeration system of a uniform pressure type, an air cooled condenser, an evaporator, a controller for changing heat input to the system in response to change in a temperature condition affected by said evaporator within a range of heat inputs having a maximum value, and a device for changing said maximum value and therefore the rate of heat input to the system at the maximum end of said range, said device being operative in response to change in a temperature condition affected by room air temperature.

17. In the art of refrigeration by expulsion of refrigerant fluid from an absorbent, liquefaction of the expelled refrigerant fluid by condensation, evaporation of the liquefied refrigerant fluid, and absorption of the evaporated refrigerant fluid in a uniform pressure system, said condensation being effected by heat transfer to a cooling medium, the improvement which consists in supplying heat to cause said expulsion of refrigerant fluid from the absorbent at different rates, and changing from a higher to a lower rate in response to increase in a temperature condition affected by the temperature of said cooling medium.

18. In the art of refrigeration by expulsion of refrigerant fluid from an absorbent, liquefaction of the expelled refrigerant fluid by condensation, evaporation of the liquefied refrigerant, and absorption of the evaporated refrigerant in a uniform pressure system, said condensation being effected by heat transfer to a cooling medium, the improvement which consists in supplying heat to cause said expulsion of refrigerant fluid from the absorbent at different rates, changing from one rate to another in response to change in a temperature condition affected by said evaporation, and changing from a higher rate to a lower rate in response to increase in a temperature condition affected by change in the temperature of said cooling medium.

ROBERT S. TAYLOR.